Sept. 15, 1959 P. J. BOUCHARD 2,903,862
HEAT TRANSFER AND CONVERSION SYSTEM
Filed Dec. 12, 1955 2 Sheets-Sheet 1

Philias J. Bouchard
INVENTOR.

United States Patent Office 2,903,862
Patented Sept. 15, 1959

2,903,862

HEAT TRANSFER AND CONVERSION SYSTEM

Philias J. Bouchard, Stowe, Vt.

Application December 12, 1955, Serial No. 552,318

13 Claims. (Cl. 62—231)

This invention relates to heat transfer and conversion systems, generally designated as heat pump systems. Such heat pump systems always include a compressor in which a medium circulated in the system is compressed and it further includes heat exchangers and valves or other means for producing an expansion of the compressed medium. On account of the similarily of this equipment with the equipment of refrigeration systems these systems are sometimes designated as heat pumps with reversed refrigerating cycle.

Known systems of this type are similar to the conventional refrigeration systems insofar as they utilize a medium circulating within a closed circulaton system which, during such circulation, passes from the liquid to a vapor or gaseous phase and they operate on a reversed refrigeration cycle insofar as heat is supplied to the expansion coil while the condenser is used for heating purposes.

These systems, however, consume much power and their size and complexity grows rapidly with the heat output. Further, the necessity of using a refrigerant alternatively evaporating and liquefying during certain phases of operation at temperatures not too far distant from each other also has some disadvantages.

According to the invention a heat production, compression and transfer system is used in which mechanical power, taken from a suitable power device, produces heat by compression of a medium, raising its pressure and temperature to such an extent that heat can be delivered to external consumption devices at a relatively high temperature, the raised pressure being thereafter used to produce mechanical power by expansion which power is fed back to the power device, while the low temperature produced by expansion is simultaneously used to feed into the system heat from a low temperature source and to convert said heat likewise into mechanical power, thus replacing the mechanical power necessary to run the system by means of pressure changes and heat supply to a large extent.

Further, according to the invention a medium may be used which need not be a refrigerant or other medium liquefying and evaporating during a cycle but which may be a compressible fluid of any kind which is circulated in a system which may be an open or closed system, and which, during such circulation, is alternatively subjected to compression and expansion, accompanied by a raising and lowering of the temperature respectively. Heat is transferred from an outside source producing heat at low temperature to the medium at those points at which the temperature of the medium is near its lowest point, while heat is transferred from the medium to a device adapted to utilize it at a point when the temperature of the medium is highest. The energy supplied to the medium during compression phase by the expenditure of mechanical power is thus replaced as completely as possible during the expansion phase during which the pressure energy is directly converted into mechanical energy and fed back to the source, while the heat energy is replaced by the absorption of heat during expansion from a low temperature outside source. As heat at low temperature is usually available either without cost or is available in the shape of waste heat, the operating costs of such a system are reduced to a minimum. By introducing heat into the system during that phase during which conversion into mechanical energy takes place, the mechanical equivalent of this heat can be added to the energy fed back to the driving means, thus securing the reduction of the mechanical energy necessary to run the system to a minimum.

Further, according to the invention, expansion of the compressed medium circulating in the system is carried out in a plurality of expansion phases each of these phases cooling the medium to a low temperature, and between these expansion and cooling phases heat from a low temperature source is transferred to the system. This heat is therefore utilizable in the expansion phase arranged behind the point of heat transfer and can therefore perform mechanical work in this expansion phase, so that the multiple expansion enables the system to take up a relatively large heat quantity at low temperature and to convert it with relatively high efficiency into mechanical energy fed back to the driving means. The mechanical energy necessary to run the system is thus small.

Further, according to the invention, the system may be run with an open circulation system for the circulating medium as well as with a closed circulating system, thus making the system highly adaptable and permitting the use of a medium, such as air, which may be constantly replaced and discharged.

The main object of the invention is thus to provide a heat production system based on the conversion of mechanical power into heat which is supplied to a compressible medium, raising the temperature of said medium to a relatively high level by changing its pressure, the heat being delivered to a device capable of utilizing it, and thereafter to subject the medium to pressure changes permitting to regain part of the energy used up by converting the pressure differences into mechanical power, such changes, on account of the lowering of the temperature of the medium during such pressure changes also permitting to supply heat to the medium from a source of heat of low temperature at those points at which the temperature of the medium is at a low point, the feed back of mechanical power to the driving means providing the mechanical power for the compression being thus increased by the heat supplied during the conversion of the pressure differences at low temperature.

A further main object of the invention consists in a system, such as above described, in which the converting of pressure into mechanical power is carried out in a plurality of stages or phases, the supply of heat to the system being carried out between such stages or phases.

A further main object of the invention consists in using a medium consisting of a gaseous substance which remans in its gaseous state during the entire process of conversion of mechanical power into heat and pressure changes and during the reconversion of heat and pressure changes into mechanical power.

A further main object of the invention consists in a system producing heat mechanically by the compression of a compressible medium due to the expending of energy supplied from a source in transferring part of the heat to a heat consumption or utilization device, while maintaining the pressure of the medium substantially at its value, in thereafter transforming the energy of the medium due to pressure into mechanical energy fed back to the source of energy and, during such conversion of the pressure energy into mechanical energy which is accompanied by a lowering of the temperature, supplying heat at low temperature to the medium at such phase of the conversion that this heat may also be converted into mechanical energy fed back to the source of energy.

The invention is illustrated in a purely diagrammatic manner in the accompanying drawings which show the same heat conversion and transfer system operated by a closed and an open circulation system for the medium respectively.

It is to be understood that the diagrammatic drawings do not show constructive details of the system and as far as such details have been used to exemplify parts of the system it is to be emphasized that such details are not considered as being an essential part of the invention and that a change or modification thereof does not in any way affect the principle of the invention.

Figure 1:
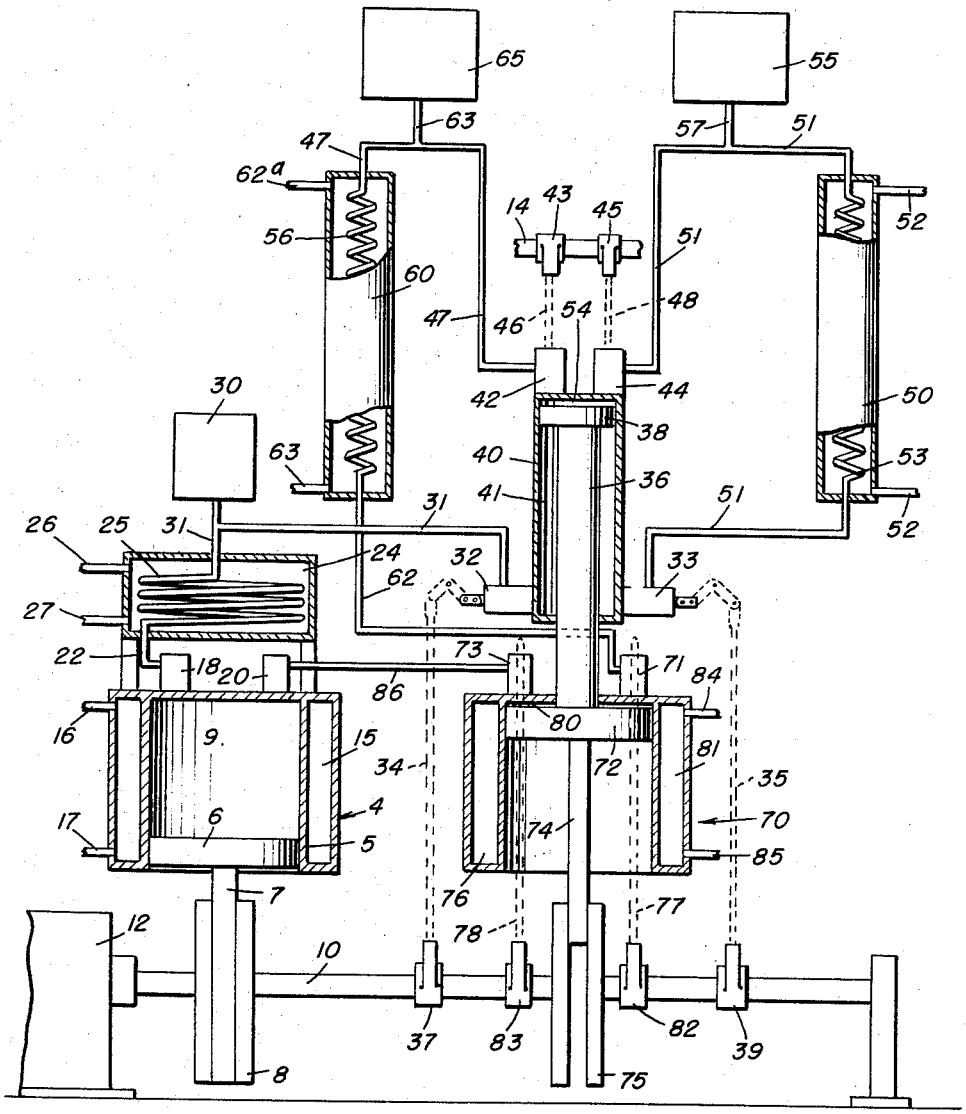
Figure 1 is a diagram of a system according to the invention, provided with a closed circulating system for the medium.

The operating method according to the invention has already been briefly characterized above. It is carried into effect by means of an operating fluid circulating in a closed or open circulation system which system, however, always contains the medium while subjecting it to the various transformations and changes. The system utilizes any compressible operating fluid, preferably a gas or a vapor. The operating method consists in first compressing said operating medium, producing a considerable raising of its pressure and heating it with a considerable increase of its temperature. This first phase is produced by the expending of energy supplied from the outside, the compression being produced in any type of compressor, such as a rotary or reciprocating compressor driven by an electric motor or by any type of engine supplying energy. During the second step or phase the medium which is now at a high pressure and temperature is run through a heat exchanger in which part of its heat is transferred to another medium, while the pressure of the operating medium is maintained at its raised value. This other medium may be a fluid, such as water or a gaseous fluid or any other fluid which permits to utilize the heat supplied to it. It will be noted that this transfer of heat which is carried away and utilized occurs at the highest temperature imparted to and reached by the operating medium.

During the following third phase or step, a stepwise expansion of the compressed operating medium to the original level is produced, such expansion occurring in appliances in which the mechanical power can be utilized. This mechanical power thus gained is fed back directly or indirectly to the source of power which produced the compression.

During the second step part of the heat was transferred in a heat exchanger and was removed and utilized. However, the medium still retained a temperature which was relatively high and much higher than that of the ambient air or of the surroundings. During the third phase or expansion however, the expansion of the operating medium produces a temperature of the same which is below that of the surroundings or the ambient air. This third step or expansion is preferably carried out in a plurality of stages. During each of these stages the temperature falls below that of the surroundings, but the pressure drop is so regulated in all stages, except the final one, that further expansion may take place.

Between the stages of expansion the operating medium is exposed to heating from sources which are at low temperature, for instance at the temperature of the ambient air, or at the temperature of a naturally supplied heat source, such as ground water or artesian well water, or waste heat from some medium utilized in an industrial process which is allowed to escape. In each of the expansion stages a pressure drop is permitted just sufficient to bring the operating medium to the temperature which is sufficiently below that of such a low temperature supply source. This permits to utilize full expansion and recuperation of the energy during expansion to the maximum extent.

In a closed circulation system the last expansion stage is no longer fully utilized but is only carried to that point at which the operating medium again reaches the temperature at which compression started so that the cycle of operations may go on indefinitely.

In an open cycle system in which the operating fluid is constantly supplied to and exhausted from the circulation system, the last expansion stage may be more fully utilized preferably by reheating of the expanded operating medium in a heat exchanger which is supplied with heat by the heated operating fluid itself before its expansion.

To describe the method and the operation of the system in detail reference will now be made to the diagrams. However, while in the diagram cylinders and reciprocating pistons have been shown by way of example it will be clear that this showing is merely symbolic and that the compression or expansion devices may be of any other type, the particular device being not essential for carrying the invention into effect.

As seen from the drawings the diagrammatically illustrated modifications are identical with respect to the principle involved and differ solely with respect to the nature of the operating fluid. The closed system can operate with any compressible fluid, but has the advantage that an operating fluid may be selected specially with respect to its properties so as to permit a rapid heat exchange.

The principle on which the invention is based and which has been explained above is carried into effect by providing a compressor 4, provided with a pump cylinder 5 in which a piston 6 is reciprocating which is driven by a piston rod 7 moved by a crank 8 on a main crankshaft 10. The main crankshaft is driven by an electric motor or engine 12 of any suitable type.

The main shaft 10 is also provided with eccentrics or cranks necessary to drive valves. Some of these valves or all of them may also be driven by means of an auxiliary shaft 14 which is indicated only fragmentarily and which is driven from the main shaft by a suitable positive mechanism such as a gear, a chain drive or the like. The pump cylinder may be provided with a water jacket 15 which is in communication with pipes 16, 17 carrying a cooling fluid which cools the cylinder. The pipes 16, 17 are usually connected with a heat exchange system by means of which the heat is dissipated or carried to a place where it can be utilized.

The pump cylinder is provided with valves 18, 20 which may be check valves operated by the pressure produced within the cylinder or within the pipe leading to the cylinder, respectively. If desired, the valves may be controlled by valve rods operated by eccentrics on the main shaft or on an auxiliary valve control shaft. The valve 18 is the compression or discharge valve of the pump cylinder, operating one way only and opening when the stroke of the piston has compressed the fluid in the cylinder to such an extent that a predetermined pressure has been reached.

The valve 20 also operates one way under a predetermined pressure and it opens only to admit the operating fluid into the cylinder. This valve remains open during the intake stroke as long as a suitable intake or entrance pressure prevails.

The compressed operating fluid under the desired pressure which has been heated to a desired temperature by the compression, enters the pipe 22 when the valve 18 opens and passes on to the heating coil 25 which is located in the boiler 24. The boiler contains a liquid or fluid which is to be heated by the system and the heat of which is utilized. The boiler is only diagrammatically indicated and its size and equipment corresponds to the purpose of the arrangement. The boiler is therefore essentially the element which utilizes the heat furnished by the system.

The coil 25 transmits its heat to the medium contained in boiler 24 (for instance water). The coil is so dimensioned that the pressure in the coil remains substantially the same so that the operating fluid leaves the coil 25 and enters pipe 31 practically with the pressure at which it was admitted to the coil and which is equal to the pressure at which the valve 18 has opened.

In order to maintain the pressure in the system connected with the coil 25 and in order to eliminate pressure fluctuations an accumulator or equalizer 30 is provided which may or may not be equipped with special equalizing means, for instance, with a loaded piston or an automatic pump which maintains the pressure in the accumulator. In most cases the accumulator or equalizer may only be a reservoir of sufficient holding capacity supplying additional pressure to the system in the case of a deficiency and taking up excess pressure.

The operating fluid which has been admitted to the pipe 31 then enters a compartment or chamber 41 of a cylinder 40, the admission being regulated by a valve 32. This valve is operated by means of a valve rod 34 (shown in dotted lines) and by an eccentric 37 on the main shaft 10, or on an auxiliary valve control shaft if such a shaft is provided. The cylinder 40 contains piston 38 reciprocating in the cylinder which is carried by a piston rod 36 of such diameter that the piston 38 and the rod 36 form together a differential piston arrangement. The piston rod has therefore a diameter which is so large that while piston 38 is on one side fully exposed to the fluid only a fraction of this surface is exposed to pressure on the other side, equal pressure in chambers 41 and 54 of cylinder 40 thus producing a pressure differential moving the piston in one direction.

The valve 32 is so adjusted that it opens only during part of the stroke of piston 36 and then closes as soon as the predetermined position of the piston has been reached during the stroke. The valve is so adjusted that it starts to open when the piston is at the end near the valve and the valve closes after a predetermined fraction of the stroke has been performed. The charge which entered through valve 32 under pressure now starts to expand in the chamber 41 and during such expansion is also cooled. The adjustment is preferably made in such a way that at the end of the expansion stroke the operating fluid is still under pressure, although this pressure is only a fraction of the pressure at which the operating fluid entered the cylinder. For instance, the charge may be so calculated that at the end of the stroke the operating fluid will have one-half of its original pressure or a fraction smaller or larger than one-half.

The piston 38 is moved within the cylinder by the pressure exercised by the expanding fluid and during such stroke can deliver power which power is transmitted as will be described below by means of a further piston and piston rod to a crank on the main shaft 10.

The chamber 41 to which the operating fluid is admitted by means of admission valve 32 is also provided with a further or exhaust valve 33 through which the operating fluid can be discharged into a pipe 51. The exhaust valve 33 is controlled by a valve control rod 35 operated by an eccentric 39 on the main shaft 10 (or on an auxiliary valve control shaft) and this valve opens at the beginning of the return stroke of the piston 38 and remains open until the piston has reached its extreme position near the said valves 32 and 33.

As the operating fluid is still under pressure when the piston starts on its return stroke as it has expanded only to the predetermined extent, the exhaust of the operating fluid through the valve 33 immediately begins upon opening of the valve and the fluid will therefore flow through pipe 51 and will reach heat exchanger 50. The fluid, while still under pressure, has however reached a temperature which is considerably below the temperature of the outer air or of other sources of heat, such as, for instance, ground water, with which it may be brought into contact.

The pipe 51 leads to a coil 53 within the heat exchanger 50 which may simply be surrounded by the outer air or may be connected with a source of heat at low temperature such as ground water, or with other fluids kept at a certain temperature by their surroundings the heat of which cannot be directly utilized.

While passing the coil 53 the fluid in said coil is heated in the heat exchanger and, still under pressure, now flows through the valve 44 which opens simultaneously with or very shortly after valve 33. This valve is controlled by valve rod 48 (shown in dotted lines) the rod being operated by an eccentric 45 on the valve control shaft 14 which is shown as a separate shaft connected with the main shaft 10. The eccentric may also be mounted on the main shaft directly, if so desired.

To maintain the pressure in the system connected with pipe 51 at a constant value a pressure accumulator or equalizer 55 may be connected with line 51. This accumulator or equalizer prevents pressure fluctuation in the system and it may, either by means of a weighed piston or by a slitable pump, be kept at the desired pressure. Alternatively it may be sufficiently large to maintain the desired pressure in the system.

The fluid entering the cylinder chamber 54 through valve 44 is still under the pressure prevailing in the system connected with pipe 51 and is approximately at the temperature of the source of heat which is represented in the diagram by the fluid circulating in the heat exchanger 50 which may be connected with the source of heat of low temperature by means of the pipes 52. The pressure in the chamber 54 is approximately equal to the pressure prevailing at the end of the expansion stroke in chamber 41 but the pressure exercised on the piston in chamber 54 will be a multiple of the pressure exercised on the other side of the piston encasing chamber 41 on account of the differences in the surfaces exposed to pressure. Thus there will be a resultant differential pressure on the piston which moves the same towards the end of the chamber 41 which is close to the admission valve 32 the piston moving also in this direction under power which is transmitted through a piston and piston rod to be described to the main shaft.

The valve 44 is however so adjusted that the operating fluid enters only during part of the stroke of the piston and expands in the cylinder after valve 44 has been closed. The expansion may start when the charge contained in chamber 41 has approximately been transferred. This being the case, on account of the difference of volume between the chambers 41 and 54 when the piston 38 has performed that fraction of its return stroke which corresponds to the ratio of the cross-sections of the chambers 41 and 54.

As seen in the diagram the piston 38 is connected with a piston 72 of a further cylinder which is described below, but it will be noted that the result of the admission of fluid under pressure into the cylinder 40, of the partial expansion of said fluid in chamber 41, followed by the transfer of the partly expanded fluid still under pressure, and followed by the expansion in chamber 54, produces a reciprocating movement of the piston 38 under power which power may be transmitted to the main shaft. It will also be noted that in the cylinder 40 expansion of the operating fluid to the final pressure with which fluid may leave the cylinder occurs in two stages, both of which contribute to the development of power acting on the piston 38.

After the expansion of the fluid in chamber 41 has been completed valve 42 opens and admits the operating fluid to the pipe system 47. The valve is again positively controlled by means of the valve rod 46 driven by an eccentric 43 mounted either on a valve control shaft 14, as illustrated in the diagram, or on the main shaft 10.

There follows the exhaust stroke for chamber 54 which coincides with the stroke performed during the first expansion stage in chamber 41. During this exhaust stroke the valve 42 remains open and the fluid which is now at low pressure and low temperature, on account of the expansion in chamber 54 enters the pipe 47 which leads to the coil 56 in the heat exchanger 60. This heat exchanger may again be either simply in contact with the outer atmosphere from which heat can be absorbed or it may be in contact with any fluid (for instance, ground water or a waste heat carrying fluid) the heat of which it is intended to utilize notwithstanding its low temperature. This heat carrying fluid is represented as entering the heat exchanger 60 by pipes or openings 62a, 63.

Recapitulating the valve operation and their timing, it will be clear that valves 32, 33, 42 and 44 which are positively controlled are adjusted according to the working diagram on which each individual arrangement produced in accordance with the system is based and that this adjustment must necessarily depend on the desired pressure and temperature conditions. Valve 32 is opened positively to start admission of the fluid into the cylinder 40 approximately in the extreme downward position (in the diagram) of piston 72 with which the differential piston 36 operating in cylinder 40 is fixedly connected. However, closure of valve 32, although positive, must be adjustable and is determined by the ratio of expansion in the first stage of expansion. It must therefore be adjusted according to the desired operation, the ratio of expansion in the first stage within cylinder 40 being of course also dependent on the ratio of expansion between the two stages of expansion occurring successively in cylinder 40.

Valve 32 is opened positively when the piston 36 has reached its end or uppermost position (in the diagram) or very shortly after this position was reached and valve 44 is opened positively briefly after or even simultaneously with valve 33. Valve 44 is closed positively, but is adjustable in accordance with the ratio of expansion in the second expansion stage, determined by the designed operation, and valve 42 is again opened positively simultaneously with or briefly after the opening of valve 32.

In order to stabilize the low pressure of the part of the system including pipes 47 and coil 56 again a pressure accumulator or equalizer 65 may be provided to eliminate fluctuation of the pressure. The pressure stabilizer 65 is connected with pipe 47 by means of a branch pipe 63.

From coil 56 of heat exchanger 60, pipe 62 leads the operating fluid under low pressure, at its temperature which has been raised to that of the atmosphere or other low temperature heat source, to the cylinder 70 within which the piston 72 reciprocates. The piston 72 is connected with the piston rod 36 of the cylinder 40 on one side and with a crank 75 on the main shaft 10 on the other side.

The cylinder 70 may be open at one end and thus has a single working chamber 80 which is equal in volume to the working chamber or space 9 of the compressor cylinder 5. As the rod 36 passing through the chamber 80 is of considerable diameter which reduces the volume to a marked extent the inner diameter of cylinder 70 is somewhat larger than the diameter of compressor cylinder 5 in order to compensate for the reduction of volume due to the piston rod 36.

The operating fluid at its lowest pressure and at a temperature which is equal to that of the source of heat of low temperature is now conducted from coil 56 and heat exchanger 60 through pipe 62 to valve 71 controlling the admission of the operating fluid to the chamber 80 of the cylinder 70. A further valve 73 controls the discharge of the operating fluid from chamber 80. Both valves 71 and 73 are positively controlled by means of valve control rods 77, 78 operated by the eccentrics 82, 83, respectively, which are mounted either on the main shaft 10 or on an auxiliary valve control shaft driven by the main shaft.

The valve 71 opens during the downward stroke of piston 72 and is closed at the end of the stroke. The valve 73 opens during the upward stroke of piston 72.

During the downward stroke of piston 72 (in the diagram) the valve admits low pressure fluid at the temperature acquired in heat exchanger 60 while during the upward stroke of piston 72 (in the diagram) the fluid is compressed to the desired extent and is transferred to the compression cylinder 5. The pressure at which the chamber 9 of the compressor is entered is regulated by the valves 73 and 20; when the proper pressure has been reached which opens valve 20, the operating fluid is again admitted into the compression cylinder chamber 9 for a new cycle.

It will be noted that the cylinder 70 and the piston 72 are so arranged that the reciprocation of the piston will not consume much power as the compression of the operating fluid in cylinder 70 is only slight. On the other hand the piston rod 74 may transmit power to the shaft 10 as piston 38 is driven during both strokes by the expansion of the fluid in two stages.

The cylinder 70 may be provided with a cooling jacket 81 through which a cooling fluid, such as water, may be circulated by means of pipes 84, 85.

If ideal conditions of heat exchange and of mechanical operation could be established the mechanical power output necessary for the compression of the fluid in the initial stage would be equal to the mechanical power produced by the expansion of the fluid in two stages in cylinder 40. Under such conditions the motor 12 would therefore only have to supply the power necessary to cover the deviation from ideal conditions. The arrangement, however, also serves as a heat pump with which the heat produced by compression is carried off and is utilized at a selected relatively high temperature in a suitable heat operated system. Under ideal conditions this heat or a substantial part thereof is replaced by the absorption of heat during the expansion stages from the low temperature source or sources. The arrangement, therefore, may be considered to be a heat pump with a minimum of energy consumption, the heat picked up from low temperature heat sources, such as the ambient air, ground water etc. being used partly for reconversion into mechanical energy and partly for bringing the fluid back to its initial temperature. The energy consumption of the system in actual operation is thus proportional to the departure from ideal conditions.

*Example of operation*

For a better understanding of the system according to the invention an operation will be described using an example intended to illustrate the temperature and pressure fluctuations within the system, without however intending to describe any actual range of application of the invention.

Let it be assumed that the temperature of the ambient air is 60° F. and that the heat exchangers 50 and 60 are heated by the ambient air, and let it further be assumed that the operating fluid is also air and that it enters the compressor at atmospheric pressure. These last named assumptions are made for the purpose of simplification, as in a closed system the operating fluid is preferably a gas other than air suitably selected to produce the most rapid and complete heat exchange within the time available. Further, let it be assumed that the cranks 8 and 75 on the crankshaft are set at 180° apart.

In order to describe a complete cycle let it finally be assumed that the compressor 4 compresses the air entering at atmospheric pressure and at a temperature of the ambient air to 225 lb. sq. in. and therefore raises the temperature to 620° F. Therefore, when motor 12 is started the air is compressed in the cylinder 5 and when it has reached the desired pressure of 225 lb. sq. in. it opens the check valve 18 and enters pipe 22 and coil 25, thus heating the water or other fluid contained in boiler 24 and produces steam in the boiler, drawn off through the pipes 26 and 27 which circulate the steam. The fluid, it is assumed, is cooled during this process to 210° F. when it leaves coil 25 and enters pipe 31.

Air at 225 lb. sq. in. and 210° F. is thus admitted to the cylinder 40 approximately at the time at which the piston 6 completes its compression stroke.

In order to keep the pressure in the system at a constant value the pipe system 31 is connected with an accumulator or pressure equalizer 30 which may either be a tank or reservoir of sufficient size or a container in which pressure is maintained at a constant value by mechanical means such as a piston or a pressure controlled automatic pump.

In the example above described it may also be assumed that the piston rod 36 is of such a diameter that the volume occupied by the piston rod 36 and that of the chamber 41 surrounding the piston rod 36 are equal in any position of the piston. Upon admission of a charge containing air at 225 lb. sq. in. and at 210° F. which charge is determined by the opening of valve 32 when piston 38 is at the lowest point in the figure, and upon the closure of the valve 32 approximately at midstroke, expansion takes place in chamber 41, the pressure in chamber 41 decreasing during such expansion to 105 lbs. sq. in., while the temperature corresponding to such expansion is now 0° F. at the end of the stroke. The piston 38 at this time has reached the position shown in Figure 1, while the piston 6 of the compressor 4 has reached the position, shown in the figure.

The piston 38 now starts to return. At this point the valves 33 and 44 are opened by their corresponding valve rods and air at 105 lbs. sq. in. and 0° F. streams through pipe 51 to the coil 53 to the heat exchanger 50 in which the coil is supposed to be heated by the ambient air to 60° F. The pressure is however maintained, fluctuations being smoothed out by the pressure equalizer 55, and the air enters into chamber 54 at a pressure of 105 lb. sq. in. and 60° F.

In view of the difference of active surfaces on the two sides of the piston, it moves downwardly in Figure 1 under the pressure difference on its two sides, thus pushing piston 72 downwardly. During such downward movement the valve 44 closes approximately in the middle of the stroke when the air in the compartment 54 starts to expand to 45 lb. sq. in. and 0° F.

In the meantime a new cycle of operation has started as piston 6 arrives at its downward position when piston 38 reached its end position shown in Figure 1 and has therefore started a new compression stroke during the downward movement of the piston into its end position near the valves 32 and 33. When the piston 38 has reached this position compressed air again enters the valve 18, coil 25, pipe system 31 and valve 32 at the pressure imparted to it during the compression stroke of piston 6 and starts to advance piston 38 towards its other end. During this movement valve 42 is opened and air at 45 lb. sq. in. and 0° F. flows through the exchanger 60 by means of pipe 47 connected with the pressure accumulator 65. The air within the coil 56 of the heat exchanger 60 is heated to 60° F. by the air admitted to the heat exchanger 60 and after leaving coil 56 the air within the said coil flows through pipe 62 to the admission valve 71 of the cylinder 70 and enters the chamber 80 at 45 lb. sq. in. and 60° F. During the downward movement of the piston 72 the air expands to the atmospheric pressure and during the expansion also a lower temperature is reached which however during the return stroke is raised again as the air under atmospheric pressure is again transferred to the compression cylinder 9. During the three stages of expansion the pistons 38 and 72 are both delivering power to the shaft during the outward stroke while, during the upward stroke piston 72 forms a load while piston 38 still delivers energy to the shaft.

A suitable flywheel (not shown) on shaft 10 may be used to equalize the rotary momentum of the shaft.

As indicated in the drawing the cylinders 4 and 70 may both be provided with heat transfer systems which are only diagrammatically indicated by the pipes 16, 17, and 84, 85 leading to the cylinder jackets 15 and 81, respectively. The pipes may lead to conventional cooling or heating systems. Also, as the cylinders 4 and 70 operate with the phase difference of 180° it is possible to connect the cooling systems of the two cylinders with each other. Further, if the temperature gradients favor such a connection the cooling system for the jacket 15 can be connected at some point with the system 26, 27 in order to increase the efficiency of the boiler system somewhat.

Figure 2:
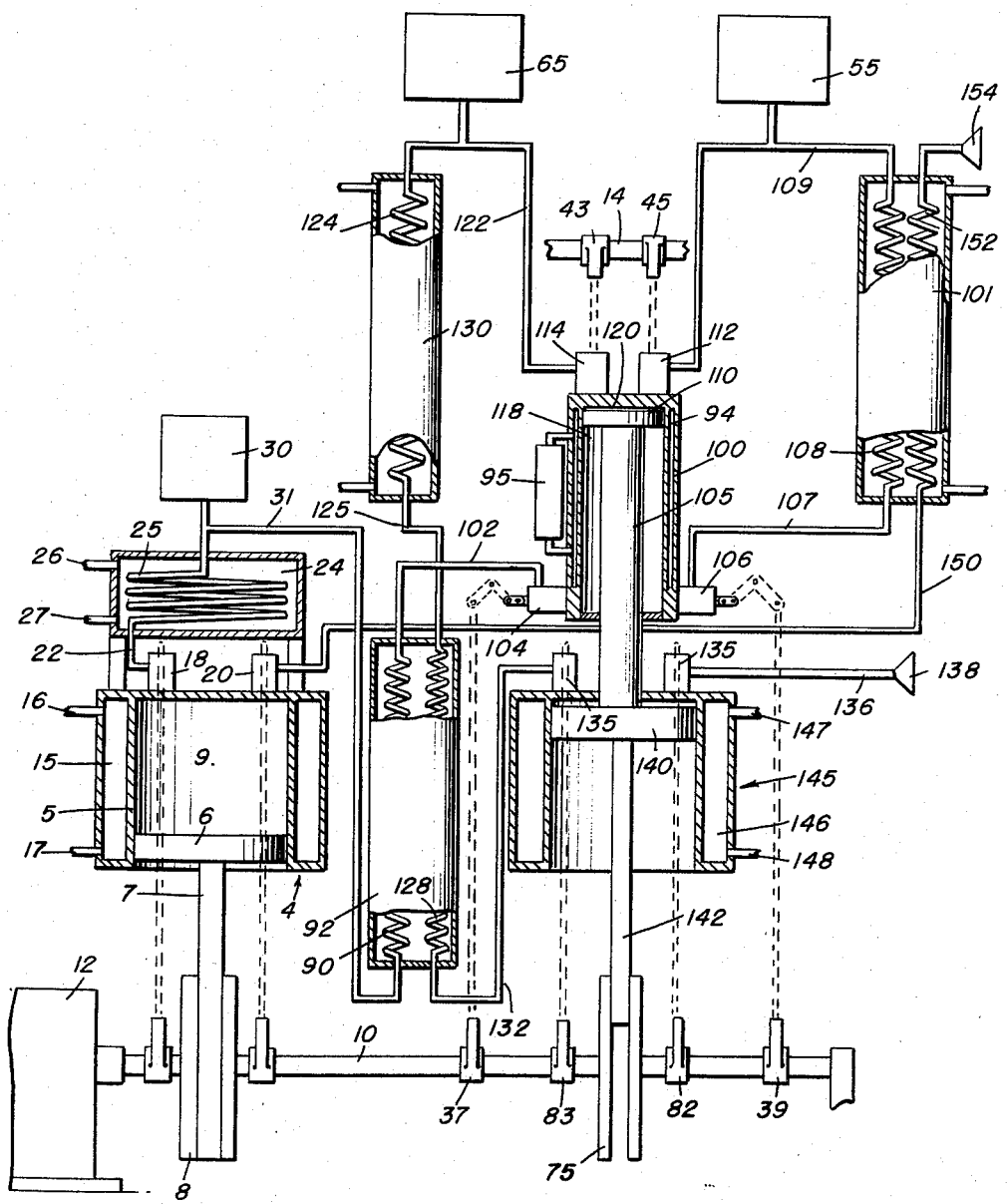
Figure 2 is a diagram illustrating a modification of the principle of the invention and shows an open circulation system for the operating fluid.

If air or a similar operating fluid is used which is constantly renewed and which may therefore constantly be supplied at one point and discharged at another point the closed circulation system may be replaced by the arrangement shown in Figure 2 which only slightly differs from the arrangement shown in Figure 1.

In Figure 2 the elements which correspond exactly to those already described in Figure 1 are designated by identical reference numerals. As in Figure 1 crankshaft 10 is driven by an electric motor or by any other engine 12, the shaft being provided with the two cranks 8, 75 and with the eccentrics or small cranks 37, 83, 82, 39. As in Figure 1 an auxiliary valve controlled shaft may be used to carry these cranks or eccentrics and which carries in addition also the eccentrics 43 and 45.

The crank 8, as in the example described previously, is connected with the piston rod 7 of the piston 6 of compressor 4 having a cylinder 5 which may be provided with a cooling jacket 15 in which a cooling fluid can circulate which is admitted and discharged respectively through pipes or openings 16, 17.

The cylinder is provided with the two valves 18 and 20, which may be check valves, the former opening when a predetermined compression has been reached and the latter admitting air into the cylinder during the outward stroke of the piston 6 when the latter produces a subatmospheric pressure. The valve 18 is connected with pipe 22 leading to coil 25 of a boiler 24 or other heat utilizing apparatus. The coil 25 is connected with the pipe system 31 and the pressure in this pipe system is maintained at a constant value by means of the pressure accumulator or equalizer 30. The pipe 31 in this case, however, leads to a coil 90 of a heat exchanger 92 and from this coil the pipe 102 leads to a valve 104 of a cylinder 100 which corresponds to cylinder 40 in Figure 1.

The cylinder 100 is shown as being provided with a jacket 94 which is filled with an anti-freeze solution and which is connected to the heat exchanger 95 which is exposed to the outer air thus maintaining the cylinder wall under suitable operating temperatures.

In the cylinder 100 a piston 110 reciprocates, said piston being mounted on the piston rod 105 which is of a diameter which reduces the cross-section of chamber 118 in which expansion occurs to such an extent that the cross-section of chamber 118 is only a fraction of that of chamber 120 at the other side of the cylinder which acts on the full surface of piston 110.

The piston rod is connected with piston 140 in cylinder 145 which in its turn is connected with piston rod 142 operating the crank 75 on the crankshaft 10.

The end of the cylinder provided with valve 104 is also provided with a further valve 106 and the other end of the cylinder is provided with valves 112 and 114. The valves 104 and 106 are operated by means of the eccentrics or cranks 37, 39 respectively, while the valves 112 and 114 are operated by the cranks or eccentrics 43 and 45, respectively. Valve 106 opens during the downward stroke of piston 110 thus permitting a discharge of the operating fluid which has expanded during the upward stroke, through valve 106 into the pipe 107. This pipe is connected with coil 108 of the heat exchanger 101, from which coil a pipe 109 leads to valve 112 which valve is also opened when valve 106 is opened but closes at a predetermined point. The pressure accumulator or pressure equalizer 55 as connected with this system has already been explained in connection with Figure 1.

The heat exchanger 101 is filled with a heat conducting medium which may or may not circulate within the exchanger. This heat exchanger is provided with a second coil 152 one end of which leads to an air admission or inlet pipe 154 while the other end of the coil is connected with a pipe 150 leading to the admission valve 20 of the compression cylinder 5.

The discharge valve 114 at the end of the cylinder 100 opens during the upward stroke of the piston 110 and said valve is connected with pipes 122 leading to coil 124 of the heat exchanger 130. The other end of the coil 124 is connected with the pipe 125 leading to a further coil 128 of the heat exchanger 92 which is also filled with a heat transmitting medium and from this coil 128 a pipe 132 leads to the admission valve 133 of the cylinder 145. The exhaust valve 135 of the said cylinder is connected with a pipe 136 leading to the exhaust opening 138.

*Operation of Example 2*

The operation of the above described example is very similar to that of the arrangement shown in Figure 1. Atmospheric air enters in this case through the air admission opening and pipe 154, passes coil 152 and reaches valve 20, the atmospheric air giving off its heat to the medium in the heat exchanger. For instance, in order to provide an example similar to the one stated in Example 1 the temperature of the atmospheric air may be 60° F. and the air during its passage in the heat exchanger 101 may be cooled to approximately 0° F. The air entering the cylinder during the outward stroke of the piston is compressed during the inward stroke of the same and at the end of the stroke, for instance, the air pressure of the compressed air may again be assumed to be 225 lb./sq. in. After passing through the coil 25 the air giving off part of its heat will enter the pipe 31 while still being at a pressure of 225 lb./sq. in. and it may again be assumed to be at a temperature of 210° F. The air passing through pipe 31, the pressure of which is maintained by means of the accumulator or pressure equalizer at a constant value, then enters the coil 90 of heat exchanger 92 where the temperature is further lowered say to 60° F. to air having however still the pressure of 225 lb./sq. in. The air then reaches the valve 104, the piston 110 being at this moment, while piston 6 has reached the end of its inward stroke, at the end at which valve 104 is located. The valve now admits a charge which expands in a three phase expansion system as above described. In the first stage of the expansion the air expands to 105 lb./sq. in. and its temperature drops to 0° F. At the end of the inward stroke of the piston 110 the valve 106 opens and remains open during the outward stroke of the piston 100. It will be clear that during the inward stroke expansion of the charge which pushed the piston inwardly will produce mechanical power which is delivered to shaft 10. During the return stroke of the piston 110 air under pressure of 105 lb./sq. in. and at a temperature of 0° F. is discharged through pipe 107 into coil 108 which, as above mentioned, is heated by the incoming air and therefore will adopt the temperature of 60° F. during its passage, its pressure remaining unchanged. The air enters chamber 120 exerting a pressure on the piston 110 which starts on its outward stroke. By virtue of the difference of pressure exercised on the two active surfaces of the piston in the chambers 120 and 118 the piston will again move under power on its outward stroke which power is transmitted to the crank 75 and shaft 10. After having admitted a charge, valve 112 closes and the charge expands to 45 lb./sq. in. and 0° F. when the piston reaches again the end near the valves 104 and 106. During the next outward stroke during which a new charge is admitted through valve 104 the discharge valve 114 is opened, air under pressure of 45 lb./sq. in. and at a temperature of 0° F. is admitted into the pipe 122 the pressure of which is again maintained at a constant value by means of the pressure accumulator or reservoir 65. The air now passes into coil 124 and is heated therein to 60° F. and then enters pipe 125 leading to coil 128 of the heat exchanger 92. By virtue of the heat transferred from the coil 90 the air when leaving coil 128 is at a pressure of 45 lb./sq. in. and at a temperature of 210° F. The air now passes through pipe 132 to admission valve 133 of cylinder 145 and enters the cylinder at a pressure of 45 lb./sq. in. and 210° F. During the outward stroke of piston 140 the air expands to atmospheric pressure and to a temperature of 60° F. During the return stroke of piston 114 the air at atmospheric pressure and temperature is discharged through valve 135, the discharge pipe 136 and the discharge opening 138.

The water jacket of the compression cylinder may again be connected with the heat utilizing system diagrammatically indicated by boiler 24, pipes 26 and 27.

The examples above mentioned describe an ideal cycle of operation which however clearly illustrate the manner in which heat from a low temperature source is used within the system according to the invention partly to preheat the circulating fluid and partly to produce mechanical energy which drives the heat pump, thus supplying part of the energy required to operate the pump.

It will be clear that the system which is indicated diagrammatically in the drawing may be changed and adapted in many ways in order to conform itself to special conditions and such change or adaptation does not involve a change of principle of invention as defined in the annexed claims.

What is claimed as new is as follows:

1. A heat pump system in which heat is supplied to a heat consumption device at predetermined temperature by an operating fluid comprising a first compression means for compressing the operating fluid from the initial pressure and temperature to a higher pressure and temperature, driving means for said first compression means, a heat exchanger and a heat consumption device connected with the heat exchanger, the operating fluid after compression circulating through the heat exchanger and transferring its heat at compression temperature to the heat consumption device, while retaining its pressure, a heat source delivering heat at a temperature lower than the initial temperature of the operating fluid, means for supplying heat from said heat source to said operating fluid, said means including a multi-stage expansion device within which the operating fluid may expand in a plurality of stages, the expansion being carried out in each stage until the operating fluid reaches an expansion temperature lower than the temperature of the heat source and a heat exchanger connected with each expansion stage for transferring heat from said heat source to the operating fluid, the temperature of which has been lowered below the temperature of the heat source, means for converting the power developed during the expansion stage into mechanical power, a second compressor means mechanically connected with the first named compression means, means for transmitting the mechanical power produced by the power converting means to the driving means of said first compression means and means for circulating the operating fluid in a closed circulation between the said first compression means and said second compression means.

2. A heat transfer system as claimed in claim 1, comprising in addition a second heat exchanger arranged in series with the heat exchanger transferring heat to the heat consumption device arranged between the latter and the means for expanding the compressed fluid, said second heat exchanger transferring heat to the operating fluid circulating between the expansion stages.

3. In a heat transfer system in which heat is supplied to a heat consumption device at a predetermined temperature by an operating compressive fluid comprising means for supplying heat to the operating fluid from an available source of heat, producing heat at a temperature lower than the temperature at which the heat consumption device is heated, a closed circulation system for the operating fluid, said circulating system including a fluid compression means, raising the initial temperature and pressure of the operating fluid to higher values, a main heat exchanger transferring heat from the operating fluid to the heat consumption device, said main heat exchanger being connected with said compression means, the operating fluid being substantially maintained at its pressure during its circulation through the said main heat exchanger, a first expansion means in which the expansion of the operating fluid produces mechanical power, a further expansion means in which the expansion of the operating medium produces mechanical power, a secondary heat exchanger between the aforesaid expansion means, said secondary heat exchanger transferring to the compressive operating fluid heat supplied by the means for supplying heat from the available source producing heat at a temperature below the temperature at which the heat consumption device is operated, means to bring the expanded operating medium back to its initial temperature and pressure, and circulation means to feed the operating fluid to the compression means.

4. A heat transfer system in which heat is supplied to a heat consumption device at a predetermined temperature by an operating fluid comprising means for supplying heat to the operating fluid from an available source of heat producing heat at a temperature lower than the temperature at which the heat consumption device is heated, a closed circulation system for an operating fluid, including a compressor means having a compression cylinder in which the operating fluid is compressed and its initial temperature and pressure is raised to a higher value, a source of power for operating said compressor means, a main heat exchanger connected with the heat consumption device through which the compressed operating fluid is circulated maintaining its pressure while transferring part of its heat, a multi-stage expansion means including an expansion cylinder within which the fluid is expanded and a piston converting its pressure and heat energy into mechanical power, means for coupling said piston with the driving means operating the compressor means, means for circulating the operating fluid between the expansion stages, a secondary heat exchanger connected for exchanging heat between said operating fluid and the means for supplying heat from an available heat source which produces heat at a temperature below the temperature at which the heat consumption device is operated, and a further expansion cylinder coupled with the aforementioned cylinder in a circulatory connection with the said cylinder of the compressor means, the operating fluid being returned during one stroke of said piston to the compressor and to its initial pressure and temperature.

5. A heat transfer system as claimed in claim 4 wherein the expansion cylinder of the multi-stage expansion means is provided with a double acting differential piston on the two sides of which expansion of the operating medium occurs in succession during the reciprocating movement of the piston.

6. A heat transfer system as claimed in claim 4 wherein the expansion cylinder of the multi-stage expansion means is provided with a double acting differential piston with different effective pressure surface areas on its two sides, and wherein a direct circulatory connection is provided between the two sides of the cylinder separated by the piston, producing power on successive strokes of the piston in opposite directions, said piston being connected mechanically with the driving means of the compression means.

7. The heat transfer system as claimed in claim 4 wherein the secondary heat exchanger connected with the source of available heat is inserted into the circulating means of the operating fluid connecting the two sides of the expansion cylinder provided with a double acting piston.

8. A heat transfer system in which heat is supplied to a heat consumption device at a predetermined temperature by a compressive operating fluid and comprising means for supplying heat to the operating fluid from an available source of heat, producing heat at a temperature lower than the temperature at which the heat consumption device is heated, a closed circulation system for the compressive operating fluid, including a fluid compression means with a compressor cylinder and a piston, a drive shaft with which the piston is connected, means for driving said drive shaft, a main heat exchanging device connected with the heat consumption device and including a heating coil connected with the compressor cylinder, through which the fluid compressed in the compressor cylinder circulates while maintaining its pressure, an expansion cylinder with a double acting piston controlled by admission and outlet valves on both sides, said valves being controlled by the drive shaft, the admission valves admitting operating fluid charges during part of the piston stroke and closing thereafter for producing expansion of said charge admitted, the piston being a differential piston with effective pressure surface areas of different size, circulation means for the operating fluid under pressure leading from the main heat exchanging device to the admission valve on one side of the expansion cylinder in which a first stage of the expansion takes place, the outlet valve on the same side of the cylinder being connected with a circulation means for the operating fluid leading to the admission valve on the other side of the cylinder in which a second stage of the expansion takes place, said last named circulation means including a first secondary heat exchanger transferring heat from the means for supplying heat from a source of available heat which is at a temperature below the temperature at which the heat consumption device is operated, to the operating fluid a further expansion cylinder provided with a piston directly connected with the double acting piston of the first named expansion cylinder, said piston of the further expansion cylinder being connected with the drive shaft, and said further expansion cylinder being provided with an admission valve and an outlet valve, the former connected with the outlet valve of the first named expansion cylinder on the side on which the second stage of the expansion takes place, said connection including a second secondary heat exchanger, transferring heat from the means for supplying heat to the operating fluid from a source from which available heat is at a temperature below the operational temperature of the heat consumption device to the operating fluid, the outlet valve of the further expansion cylinder being connected with the inlet valve of the compressor cylinder.

9. The heat transfer system as claimed in claim 8 wherein the circulation means inserted between the heat consumption device and the first named expansion cylinder, the circulation means between the outlet on one side of the aforesaid named expansion cylinder and the inlet on the other side of the same expansion cylinder, and the connection between an outlet of the first named expansion cylinder and the inlet of the further expansion cylinder are all provided with pressure maintaining accumulators reducing pressure fluctuations to a minimum.

10. A heat transfer system in which heat is supplied to a heat consumption device at a predetermined temperature by a compressive operating fluid comprising means for supplying the operating fluid with heat supplied from an available source supplying heat at a temperature lower than the temperature at which the heat consumption device is heated, a circulation system for said compressive operating fluid, including a fluid compression means with a compressor cylinder, and a piston, a drive shaft with which the piston is connected, means for driving said drive shaft, a main heat exchanger connected with the heat consumption device and including a heating coil connected with the compression cylinder, a check valve in this connection, an expansion cylinder for two stage expansion, with a double acting differential piston, each side of the expansion cylinder forming an expansion stage, an admission and an outlet valve on each side of the expansion cylinder, the admission valve of the side in which the first stage of expansion takes place being connected with the main heat exchanger by means of a first secondary heat exchanger within which the operating fluid entering from the main heat exchanger discharges a further portion of its heat, a connection between the outlet valve of the expansion cylinder side wherein the first stage of expansion takes place and a second circulating means leading to a secondary heat exchanger heated by ambient air, said second circulation means being further connected with the inlet valve on that side of the cylinder in which the second expansion stage takes place, the double acting differential piston within the expansion cylinder, having active pressure surface areas of different size, the outlet valve on the last named side of the cylinder being connected with a third circulation path including a third secondary heat exchanger, heated by ambient air, the last named circulation path also including the first secondary heat exchanger, heated by the operating fluid circulating between the main heat exchanger and the expansion cylinder, a further expansion cylinder with a piston reciprocating therein, said further expansion cylinder being connected with the third circulation path thus admitting preheated operating fluid for expansion, the last named piston being connected on one side with the drive shaft and on the other side with the double acting piston of the first named expansion cylinder, the pistons of the expansion cylinders thus acting in common on the drive shaft driving the compression cylinder transmitting power to the said drive shaft.

11. A heat transfer system as claimed in claim 10 wherein the operating fluid is air.

12. A heat transfer system as claimed in claim 10 wherein the operating fluid is air admitted into the compression cylinder, a valve regulating said admission, and a suction pipe connected with the valve, said suction pipe being connected with the heating coil of the second secondary heat exchanger, transferring heat from the inflowing ambient air to the said operating fluid circulating between expansion stages.

13. A heat transfer system as claimed in claim 11 wherein the air that entered said expansion cylinder after expansion is exhausted into the open air on the return stroke of the piston following the expansion stroke.

References Cited in the file of this patent

UNITED STATES PATENTS

| 224,785 | Lighthall | Feb. 24, 1880 |
| 231,886 | Allen | Sept. 7, 1880 |
| 250,586 | Selfe | Dec. 6, 1881 |
| 1,916,242 | Williams | July 4, 1933 |
| 2,030,509 | Frankl | Feb. 11, 1936 |
| 2,124,289 | Ericson | July 19, 1938 |
| 2,143,895 | Musham | Jan. 17, 1939 |
| 2,446,411 | Dearborn | Aug. 3, 1948 |

FOREIGN PATENTS

| 88,274 | Switzerland | Feb. 16, 1921 |